United States Patent
Henke et al.

(10) Patent No.: US 8,760,017 B2
(45) Date of Patent: Jun. 24, 2014

(54) ELECTRIC MACHINE

(75) Inventors: Thomas Henke, Borgholzhausen (DE); Stefan Rosenau, Detmold (DE); Hans Teuber, Oerlinghausen (DE); Werner Hangmann, Oerlinghausen (DE)

(73) Assignee: Hanning Elektro-Werke GmbH & Co. KG, Oerlinghausen (DE)

( * ) Notice: Subject to any disclaimer, the term of this patent is extended or adjusted under 35 U.S.C. 154(b) by 325 days.

(21) Appl. No.: 13/175,837

(22) Filed: Jul. 2, 2011

(65) Prior Publication Data

US 2012/0001505 A1    Jan. 5, 2012

(30) Foreign Application Priority Data

Jul. 5, 2010 (DE) .......................... 10 2010 030 949
Nov. 9, 2010 (DE) .......................... 10 2010 043 629

(51) Int. Cl.
*H02K 9/06* (2006.01)

(52) U.S. Cl.
USPC .......................................................... 310/62

(58) Field of Classification Search
USPC .................... 310/12.29, 62, 64, 58, 59, 61, 60
See application file for complete search history.

(56) References Cited

U.S. PATENT DOCUMENTS

| 5,910,694 A * | 6/1999 | Yokozawa et al. .............. 310/89 |
| 2006/0022529 A1 | 2/2006 | De Filippis et al. |
| 2007/0273220 A1 | 11/2007 | Koyama et al. |
| 2009/0153094 A1 * | 6/2009 | Henke ........................... 318/700 |
| 2009/0289513 A1 | 11/2009 | Vadillo et al. |
| 2011/0278970 A1 | 11/2011 | Lau et al. |

FOREIGN PATENT DOCUMENTS

| DE | 10230244 A1 | 1/2004 |
| DE | 102004036281 A1 | 11/2005 |
| EP | 1621773 A1 | 2/2006 |
| GB | 2423420 A | 8/2006 |
| JP | 2005094949 A | 4/2005 |

* cited by examiner

*Primary Examiner* — Burton Mullins
(74) *Attorney, Agent, or Firm* — Patent Central LLC; Stephen A. Pendorf

(57) ABSTRACT

Electric machine, in particular an electric motor, which comprises a motor support, a stator, a rotor, a fan arranged at the face end of said motor and an electronics casing disposed adjacent to the motor support for electronic components to be arranged in wherein a face-end wall of the motor support which is assigned to the fan is provided with an axial opening such that an air stream discharged from the motor support is by means of said fan deflected toward the electronics casing.

19 Claims, 4 Drawing Sheets

ELECTRIC MACHINE

This present invention relates to an electric machine, in particular an electric motor, which comprises a motor support, a stator, a rotor, a fan arranged at the face end of said motor and an electronics casing disposed adjacent to the motor support for electronic components to be arranged in.

Prior known from DE 20 2008 015 895 U1 is a an axial-flow ventilated electric motor whose frame is provided with openings at its opposing face ends such that an axial air stream can be passed through the frame by a fan for the purpose of cooling a stator and/or rotor. Where electric components are fitted within the motor frame, provisions can be made for additional cooling thereof.

EP 0 724 324 B1 discloses an electric motor which on the one hand comprises a frame accommodating a stator and a rotor and on the other hand is provided with an electronics casing attached to said motor frame for accommodation of electronic components (control system) to operate the electric motor. A fan is disposed at one of the motor frame face ends and covered up by a fan hood. Said hood is adapted to draw an air stream from the ambience and pass it across the motor frame for cooling it. For electronic components also to be cooled an outer ring of the fan hood has a radial opening such that part of the intake air stream may be directed outward to cooling ribs of the electronics casing. A drawback affecting this prior art electric motor resides in that part of the air stream intended for cooling the motor frame has to be branched off for cooling the electronics casing and is hence no longer available for cooling the frame.

Prior known from DE 101 47 472 A1 is a drive comprising an electric motor and a static power converter arrangement wherein the converter components are contained in separate modules of which one module includes a rectifier unit, an intermediate circuit unit and a inverter unit and the other comprises an electronic control unit and is adapted to be joined with the electric motor. Said separate arrangement of rectifier unit, intermediate circuit unit and inverter unit on one side and the control electronic unit on the other permits to achieve thermal decoupling such that the electronic control unit is no longer being affected by thermal radiation and/or thermal conduction generated by the power semiconductors of the rectifier unit and the inverter unit. It is possible also to operate the power converter arrangement at very high ambient temperatures because besides the electric motor it is only the electronic control unit that may be disposed close to the cooking area. This prior known drive is however affected by the drawback that its flexibility is restricted. The power semiconductors of the converter arrangement are rated for operation on defined system voltages and frequencies, for instance 100 V, 200 V, 360 V or 480 V and/or 50 or 60 cps. When using the steam cooker in the USA and in Germany, for example, the substantially complete power converter assembly including the rectifier unit, the intermediate circuit unit and the inverter unit would have to be exchanged.

DE 200 23 570 U1 describes a drive for a cooker which comprises a rectifier unit, an intermediate circuit unit, an inverter unit and an electronic control unit for operating an electric motor wherein the configuration of rectifier and inverter unit is governed by the electronic control unit. No provision is being made for any rectifier setting independent of the inverter setting.

Prior known from DE 10 2005 032 965 A1 is a power converter fed electric motor having a rectifier unit and an electronic control unit disposed at the face end of a motor frame. This enables a converter type motor to be of compact design.

DE 102 15 822 A1 discloses a drive comprising a rectifier unit, an intermediate circuit unit, an inverter unit and an electric motor. Rectifier and electric components such as an electronic power switch are forming a supply unit or power pack by means of which in a regenerative operating mode the electric power given off by the motor is interim stored in a buffer unit. This supply unit hence only serves to control the interim storage of energy with is generated in the regenerative operation of the motor.

It is an object of this present invention to improve an electric machine comprising a motor support and an adjacent electronics casing in such a way that efficient ventilation will be ensured both of said support and of said electronics casing.

To achieve this object the electric machine is in conjunction with the preamble of patent Claim 1 characterized by the fact that a face end wall of the motor support juxtaposed to a fan is provided with an axial opening such that an air stream discharged from the motor support is deflected toward the electronics casing.

The particular advantage of this present invention resides in that one air stream is being used to cool both a motor support and an adjacent electronics casing. A fan disposed at one of the motor support face ends is used to deflect an air stream discharged through axial openings in an end face of the motor support preferably in radial direction toward the electronics casing. The fan hence has a dual function, namely on the one hand to draw an air stream passed through the motor in substantially axial direction and on the other hand to serve as an air guide means deflecting said axial air stream toward the electronics casing in radial direction. Advantageously can an essential portion of the air stream intended for internal ventilation of the motor be used for ventilating and/or cooling the electronics casing also. This affords the advantage that efficient cooling of electric components disposed outside the motor, for instance a frequency converter, will be obtained without too much space needed.

A preferred embodiment of this present invention provides for the fan to have an impeller with a plurality of fan blades and a fan disk which in coaction with an opposite end face of the motor support serves as a wall for an air duct through which the air stream is passed outward substantially in a radial and/or transversal direction.

The air stream inside the air duct flows from inside out in radial direction since the axial opening of the face-end wall is disposed in a region proximal to its centerline. The axial opening is preferably formed by a plurality of annular or circular apertures.

A modification of this invention provides for a rim adjacent to an end face of the motor support which rim partially surrounds the fan and which deflects at least part of the air stream toward cooling ribs of the electronics casing that are disposed in a plane in which the fan extends. This rim canalizes the air stream toward said cooling ribs of the electronics casing in that branch air streams diverging in a star-shaped pattern are combined. This affords the advantage that an air stream of high flow density is directed to the electronics casing.

According to a further modification of the invention is said rim provided with a circular recess extending over a concave angle area and having free ends confining parallel cooling ribs of the electronics casing. The advantage hereby achieved is that the air stream is annularly collected in a predetermined preferential direction along the rim to the cooling ribs.

A still further modification of this invention provides for the rim to be integral with the face end of the motor support while forming a bell-shaped A-side bearing bracket thereon. The advantage hereby achieved is that the amount of material and the space needed for forming the air duct are minimized.

According to another modification of this present invention is the fan disk solid to thereby form a continuous wall for the radial air duct.

A modification according to Claim 10 provides for the electric motor to form one common structural module together with the inverter unit and the electronic control unit which is disposed separate from a power pack module comprising the rectifier unit and the intermediate circuit.

This advantageously provides a drive with an electric motor and a power converter arrangement such that the extent of provisions needed to make the drive better suitable for universal operation on different types of incoming supplies. In particular is the flexibility of the drive in terms of operating modes increased. Provision is made for a functional and spatial separation of the power converter arrangement to the effect that a rectifier unit and an intermediate circuit unit substantially form a power pack module which is spaced from any further components of the power converter assembly and/or the motor. The power pack module may be adapted to specific feed-in conditions such as feed-in voltage and/or feed-in frequency as well as to legal provisions on electromagnetic compatibility. The inverter unit forms one compact structural module together with the electric motor and the electronic control unit and irrespective of whatever feed-in conditions has the same configuration at all times.

A preferred embodiment of this present invention according to Claim 12 provides for the power pack module to be adapted to any specific input voltage and/or input frequency. While the configuration of the inverter unit remains unchanged, the components of the power pack module will be adapted to given feed/system conditions. This means that different power pack modules having components (power semiconductors) adapted to specific system conditions may be used for different types of supply systems. Different types of power pack modules may hence be combined with the inverter unit and the electronic control unit for different types of supply systems at option.

A preferred embodiment according to Claim 13 provides for the power pack module to be designed such that at an output thereof an intermediate circuit voltage having a constant voltage level can be generated. It is due to availability of such a constant voltage level that the inverter unit assigned to the electric motor may remain unchanged under different feed-in conditions. This intermediate circuit voltage level is adapted to the rating of the motor such that the same electric motor and/or the same inverter unit may be used for different types of supply systems in every case.

According to a modification as per Claim 14 the power pack module is provided with a type of low-frequency filter that complies with all requirements regarding electromagnetic compatibility. This means that a different type of low-frequency filter can be used for any different type of supply system dependent on given feed-in conditions including said legal provisions on electromagnetic compatibility. The filter extent can be reduced thereby.

Another modification of this invention according to Claim 15 provides for the power pack module to have a transducer by means of which an intermediate circuit voltage having a constant voltage level can be generated at the output end of said module. This constant voltage level may be in the range of 300 V, 20 V, for instance. This affords the advantage that inverter unit and electric motor can be operated from different supply systems in the range between 100 V and 480 V.

According to the modification of this invention as per Claim 16 the power pack module is arranged such a distance away from the cooker and/or the cooking space thereof that the operating temperature of said module keeps below a predetermined threshold value. This threshold value may for instance be 90° C. The benefit afforded thereby is a reduced cooling effort and long-time operational stability.

Other advantages of this present invention are as disclosed in the subclaims.

Exemplary embodiments of the invention will now be described in closer detail with reference to the accompanying drawings.

Figure 1:
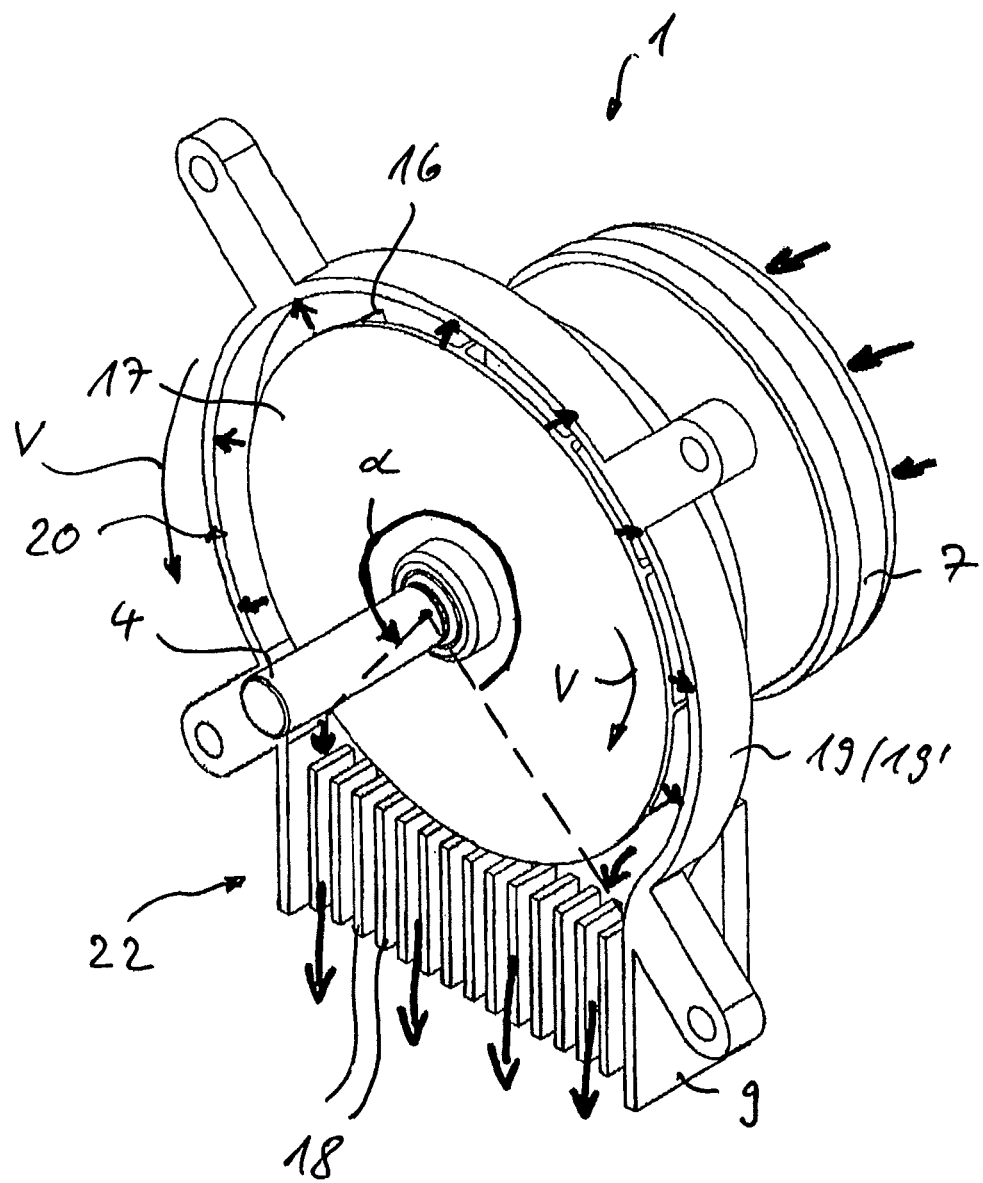
FIG. 1 is a perspective front view of an electric motor comprising a motor support and an electronics casing disposed adjacent to the underside thereof.

An electric machine of this present invention may for instance be an axial flow ventilated electric motor 1, preferably of electronically commutated synchronous type, which can be used to operate such equipment as cookers. Said electric motor 1 comprises a motor support 2 in which a stator 3 and a rotor 5 non-rotatably connected to a drive shaft 4 are disposed.

The motor support 2 has on its drive end an A-side bearing bracket 6 and on its opposite non-drive end a B-side bearing bracket 7 wherein the A-side bracket 6 is of larger diameter than the B-side bracket 7. A-side and B-side bearing bracket may for instance be flanged to a shell face of the motor support 2 and are each seated on a drive shaft 4 with the aid of bearings 8. The stator 3 extends in an annular region between said A-side and said B-side brackets. The A-side bearing bracket 6 and the B-side bearing bracket 7 are each direct flanged to the stator 3.

In a not-shown alternative embodiment of this invention is the stator 3 surrounded by a tubular enclosure body and/or pressed into said latter. The tubular body serves as motor support and is connected to the A-side bearing bracket 6 and the B-side bearing bracket 7. Alternatively, said tubular enclosure body preferably fitted with radially extending cooling ribs may be shrunk to the stator 3 or be positively applied thereto by pressure die casting.

On the other hand is the electric motor 1 provided with an electronics casing 9 which directly adjoins a circumferential edge of the motor support 2 and which serves to accommodate electronic components such as power semiconductors or such like for forming a frequency converter to operate and control the electric motor 1. The electronics casing 9 may be formed by an extension of the A-side bearing bracket 6 also in which case electronic components disposed on a circuit board will be disposed in a predetermined location within the area of said extension.

The B-side bearing bracket 7 has as an axial opening a plurality of annularly disposed apertures 10 which are forming an inlet for an air stream 11 that builds in an axial direction within the motor support. Said apertures 10 are each disposed in an area which is distal or proximal to the centerline of a face-end wall 12 of the B-side bearing bracket 7 that extends perpendicular to the drive shaft 4.

The A-side bearing bracket 6 has in a face-end wall 13 extending perpendicular to the drive shaft 4 an axial opening which comprises a plurality of annularly distributed apertures 14 which are forming an air outlet of the motor support 2. Said apertures 14 are disposed proximal to the centerline of the face-end wall 13.

In axial direction and adjacent to the face-end wall 13 of the A-side bearing bracket 6 there is a fan (radial fan) 15 disposed which is non-rotatably attached to the drive shaft 4. The fan 15 has an impeller with a plurality of fan blades 16 and a solid fan disk 17. The blades 16 extend in radial direction on a side of the fan disk 17 which is proximal to the face-end wall 6 and are integral therewith. The fan disk 17 is preferably integral with the fan blades 16. The fan disk 17 may be provided with openings as well.

The electronics casing 9 is arranged adjacent to a circumferential edge of the A-side bearing bracket 6 in an extension plane E of the fan 15, namely beneath the underside of said bracket 6, and has as number of parallel cooling ribs 18 in said plane E.

The A-side bearing bracket 6 is bell-shaped and provided with a rim 19 adjacent to a circumferential edge of the face-end wall 13 which rim has an annular and/or circular recess whose length conforms to a concave angle area a in circumferential direction. Said rim 19 surrounds the fan 15 and has an inner diameter larger than the outer diameter of the fan disk 17. Hence there is an annular gap 20 between an axial face 19' of the rim 19 and a circumferential edge of the fan disk 17 for guiding the air stream 11.

Figure 3:
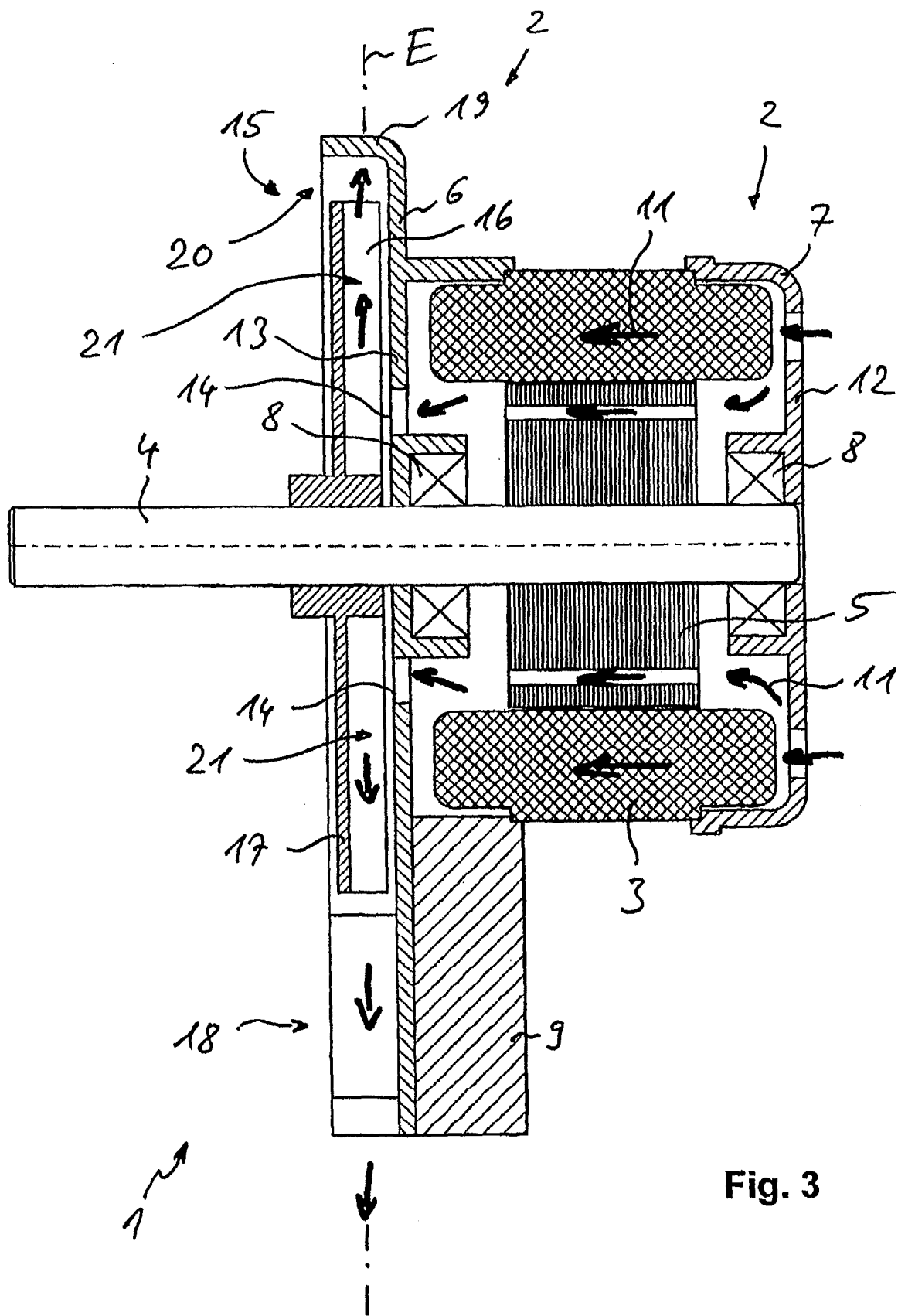
FIG. 3 is a longitudinal section through the electric motor.

As will be seen more clearly from FIG. 3, the relatively parallel fan disk 16 and the face-end wall 13 of the A-side bearing bracket 6 are forming walls of an air duct 21 that extends in plane E and in which the air stream 11 discharged from the motor support 2 via the apertures 14 of the face-end wall 13 is deflected from an area proximal to an area distal to the centerline thereof. The air stream can flow in radial and/or circumferential direction and clears the air duct 21 along the circumferential edge of the fan disk 17. A first portion of said air stream 11 is collected inside the annular gap 20 and in a preferred direction V directed to the cooling ribs 18 in an annular flow pattern. A second portion of said air stream 11 is direct transferred to the cooling ribs 18 in an area in which the rim 19 is open and without the axial surface 19'. Said first portion of the air stream 11 flows circumferentially up to an open area 22 of the rim 19 in which the cooling ribs 18 are disposed.

Cooling and/or ventilating of the electric motor 1 is hence effected in two steps, namely in a first step in which the air stream 11 is drawn from the ambience by means of the fan 15 in that the air stream 11 enters the motor support 2 via the air inlet 10 and in a substantially axial direction right passes right up to the air outlet 14 at the opposite A-side bearing bracket 6 for the purpose of cooling the stator 3 and/or the rotor 5, and in a second step in which that same air stream 11 is deflected cross to the drive shaft toward the cooling ribs 18 of the electronics casing 9 via the air duct 21 and/or the annular gap 10. This implies that said air stream 11 can be utilized for cooling electronic components arranged inside the electronics casing 9 also. Finally, the air stream 11 is discharged into the ambience.

The electric motor 1 of this invention may for instance be used with hot air furnaces or pump systems, in particular for cooking equipment such as combination steam cookers.

Figure 2:
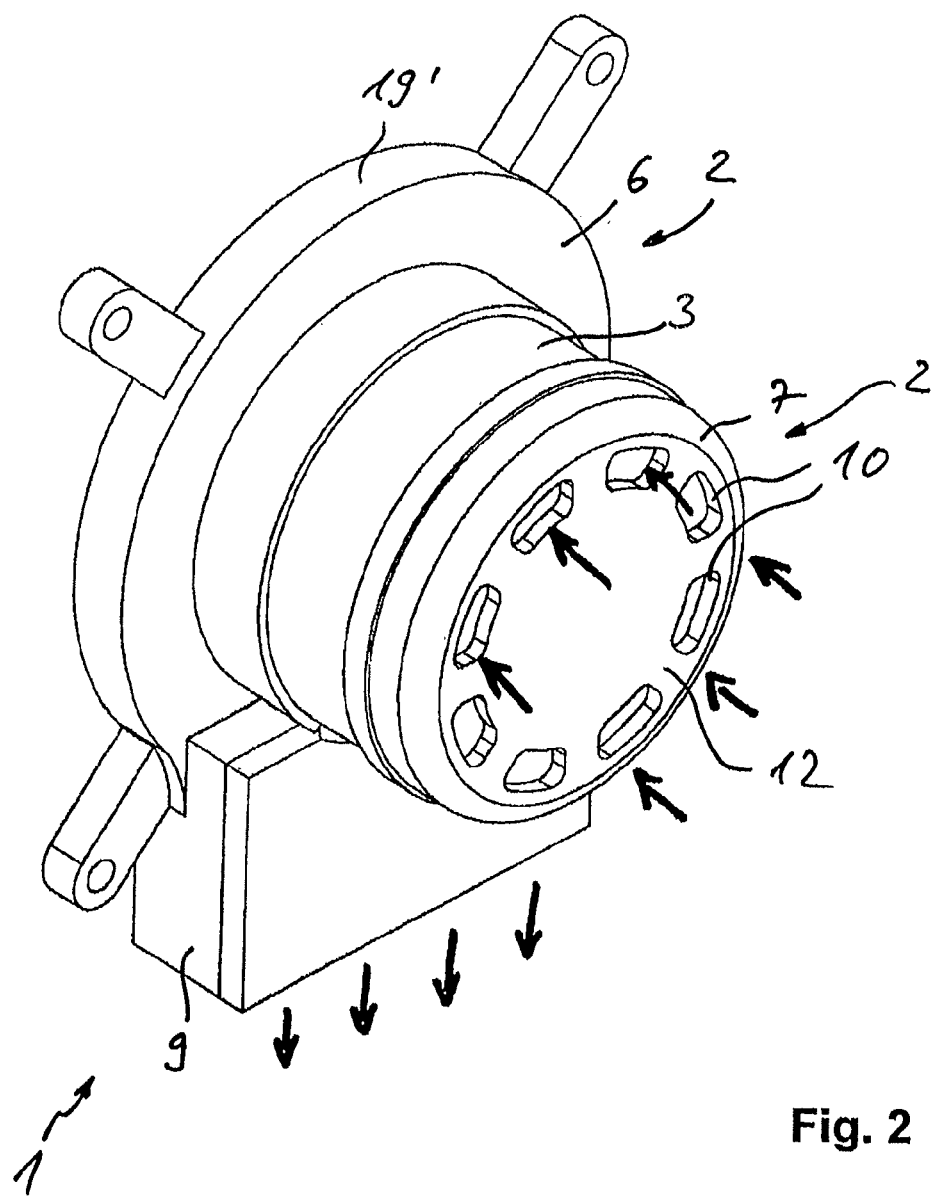
FIG. 2 is a perspective rear view of the electric motor.

According to the embodiment shown in FIGS. 1 to 3 the inverter unit, the electronic control unit and and the power pack module with intermediate circuit are all arranged inside the electronics casing 9.

Figure 4:
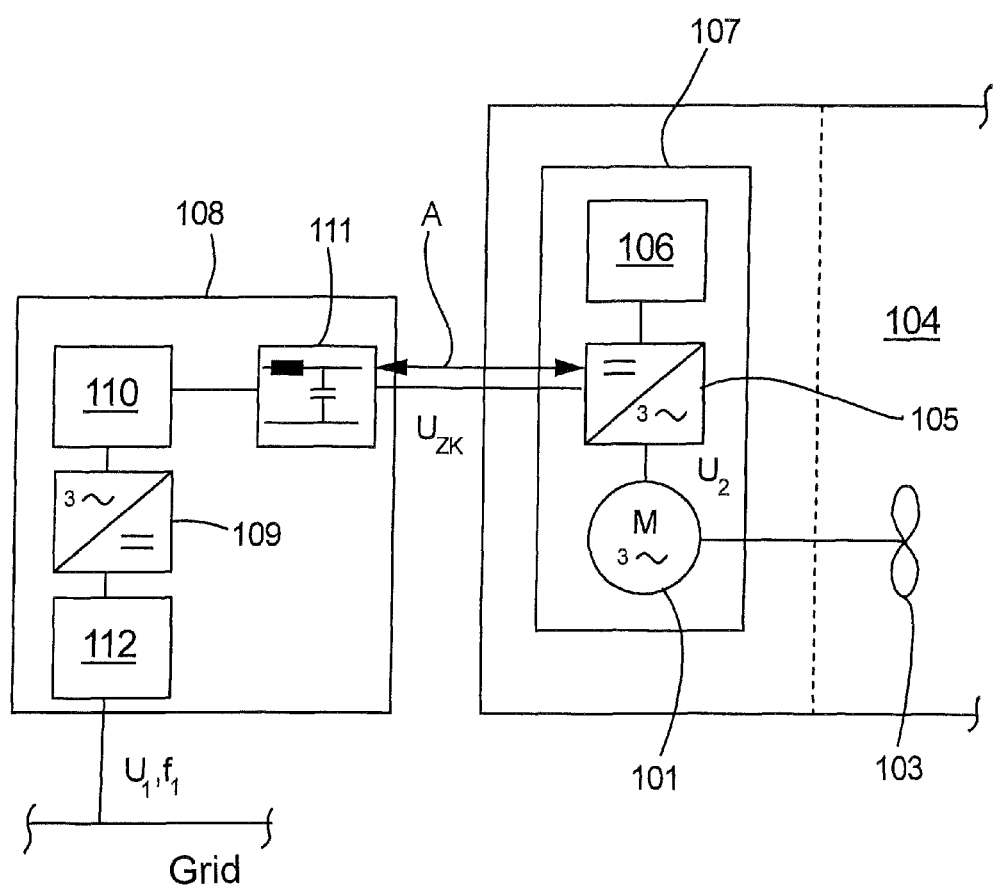
FIG. 4 is a schematic drawing which shows an alternative embodiment of a drive according to the present invention.

In a further embodiment of this present invention as per FIG. 4 can an inverter unit 105, an electronic control unit 106 and an electric motor 101 constitute one common module 107 which is arranged in a spaced relation from a power pack module 108 comprising the rectifier unit 109 and the intermediate circuit 111.

The electric motor 101 is a three-phase synchronous motor coupled with a fan impeller 103 via a drive shaft for circulating hot air inside the cooking space 104 of a cooker. The cooker may be of steam operated type wherein the impeller 103 is used for steam generation also by applying water to the relatively hot blades of the impeller 103.

The electric motor 101 together with inverter unit 105 and electronic control unit 106 is one common module 107 for installation directly at back of or aside the cooking space 104. The electronic control unit 106 may for instance comprise an electronic signal assembly (microcomputer and/or microcontroller) for activating the inverter unit 105 and/or the electric motor 101. Said inverter unit 105 may include an intermediate circuit buffer, a drive circuit arrangement and/or an inverter output stage.

In a distance A from the structural module 107 there is a power pack module 108 arranged which substantially comprises a rectifier unit 109, a transducer unit 110, an intermediate circuit unit 111 and a filter unit 112. The power pack module 108 is arranged on a side of module 107 that is facing away from the cooking space. Said distance A is at least 0.5 m for the working temperature of power pack module 108 to keep below a predetermined threshold value of for instance 90° C. This distance A may also be smaller where the opposed casing walls of the power pack module 108 and/or the structural module 107 are heat insulated and may be just a few millimeters or zero where space availability is restricted, however provided that an adequate heat insulation is provided. Where said distance A is zero said opposed casing walls of power pack module 108 and structural unit 107 are in direct contact with each other.

The input side of the power pack module 108 is connected to a power supply system operated on a three-phase system voltage $U_1$ and a frequency $f_1$. The system voltage $U_1$ may be 230 V and the system frequency $f_1$ may be 50 cps for instance. Alternatively may the power pack module 108 be connected to a battery or other power sources also.

The rectifier unit 109 preferably comprises a line commutated rectifier and an active regulating loop for power factor correction which transforms the input system voltage $U_1$ into a DC voltage. A transducer unit 110 is arranged behind the rectifier unit 109 and may for instance comprise a step-up converter (step-up switching regulator) and/or a step-down converter (step-down switching regulator) to generate a constant voltage level $U_{ZK}$ at the output of power pack module 108. The intermediate circuit 111 includes at least one coil and one capacitor such that the electrical energy as fed in may be buffered while providing said constant voltage level having the voltage $U_{ZK}$.

The filter unit 112 comprises at least one low-frequency filter which particularly improves the electromagnetic compatibility of the steam cooker in case of interferences from the supply system. Said low-frequency filter may be designed in such a way also that any electric interference from the public power supply system will be restricted by the steam cooker as such.

The inverter unit 105 is provided with an inverter for a motor rated voltage $U_2$ such that it will be enabled to generate the predetermined three-phase motor rated voltage $U_2$ from the intermediate circuit voltage $U_{ZK}$.

Dependent on a cooker's feed-in conditions, particularly in respect of different power supply systems such as 100 V-230 V 50 cps/60 cps 1☐ or 360 V-480 V 50/60 cps 3☐, the configuration of the power pack module 108 will be altered to the effect that the rectifier unit 109 and/or the transducer unit 112 are adapted to the feed-in conditions or type of feed-in in every particular case. The rating of the filter unit 112, too, will be tuned to given feed-in conditions, especially in regard to the provisions on electromagnetic compatibility. This way a drive may be flexibly made available for most different applications while the configuration of the structural module 107 remains unchanged at all time and said module is integrated in the steam cooker. The power pack module 108 is likewise integrated in a casing of the steam cooker, though spaced from the electric motor 101 and disposed in the area of a casing edge to thereby facilitate access thereto and/or the exchanging thereof.

The drive of this present invention can be used for any kind of motor driven equipment or devices where there are high thermal loads in the motor area on the one hand and where there is a relatively vast variety of power feed-in and filter requirements. The drive of this present invention may for instance be used to operate pumps of household appliances such as dishwashers. It is also suitable for use in laboratory, medical or industrial equipment. It affords improved modularity in the design and configuration of motor operated facilities.

The invention claimed is:

1. An electric machine which comprises:
   a motor support,
   a stator fixed to the motor support,
   a rotor mounted for rotation relative to the stator, the stator and rotor together forming an electric motor,
   a fan arranged in proximity to the motor support at one face end of said motor, and
   an electronics casing directly joined to and disposed adjacent to the motor support for housing electronic components for operating and controlling the electric motor,
   wherein a face-end wall (13) of the motor support (2) which is in proximity to the fan (15) is provided with an axial opening (14) through which an air stream (11) is drawn through the motor in substantially axial direction for ventilating and cooling of the motor, and wherein the air stream (11) discharged from the motor support (2) by means of said fan (15) is deflected toward the electronics casing (9) for ventilating and/or cooling the electronics casing (9).

2. The electric machine according to claim 1, wherein the fan (15) comprises an impeller with a plurality of fan blades (16) and a fan disk (17) from which the blades (16) protrude on a side proximal to said face-end wall (13) such that an air duct (21) is formed to carry the air stream (11) outward in a radial plane (E).

3. The electric machine according to claim 1, wherein the axial opening (14) of the face-end wall (13) is arranged in a region close to the centerline thereof.

4. The electric machine according to claim 1, wherein adjacent to the face-end wall (13) of the motor support (2) there is a rim (19) provided which surrounds part of the fan (15) and by means of which the air stream (11) is at least partially deflected toward cooling ribs (18) of the electronics casing (9) which are disposed in an extension plane (E) of the fan (15).

5. The electric machine according to claim 1, wherein the rim (19) has an annular recess extending over a concave angle region ($\alpha$) and that free ends of said rim (19) confine said cooling ribs (18) extending parallel to one another.

6. The electric machine according to claim 1, wherein the rim (19) is integral with the face-end wall (13) to form a bell-shaped A-side bearing bracket (6).

7. The electric machine according to claim 1 wherein the motor support (2) comprises a B-side motor bracket (7) with at least one axial opening (10) for air intake to form an axial air stream (11) between the B-side bearing bracket (7) and the A-side bearing bracket (6).

8. The electric machine according to claim 1, wherein the fan disk (17) is non-rotatably seated on a drive shaft (4) and that it is solid for generating a vacuum to draw the air stream (11).

9. The electric machine according to claim 1, wherein the rim (19) is of annular shape with such a radius as to provided an annular gap (20) between the fan (15) and the rim (19) which carries the air stream (11) in circumferential direction right to an open area (22) of said rim (19) which is occupied by the cooling ribs (18).

10. The electric machine according to claim 1, wherein a static power converter assembly is assigned to the electric motor (101) which comprises a rectifier unit (109) an intermediate circuit unit (111) an inverter unit (105) and an electronic control unit (106) wherein the inverter unit (105), the electronic control unit (106) and the electric motor (101) are combined into one common structural module (107) which is arranged in a location separate from a power pack module (108) that comprises the rectifier unit (109) and the intermediate circuit (111).

11. The electric machine according to claim 1, wherein the power pack unit (108) is adapted to given feed-in conditions, and that said structural unit (107) always has the same configuration irrespective of what feed-in conditions may prevail.

12. The electric machine according to claim 1, wherein the circuit arrangement of the power pack module (108) is adapted to a system voltage ($U_1$) and a system frequency ($f_1$).

13. The electric machine according to claim 1, wherein the power pack module (108) is designed such that at an output thereof an intermediate circuit voltage ($U_{ZK}$) having a constant voltage level can be generated which is adapted to the rating of the electric motor (101) and/or the inverter unit (105).

14. The electric machine according to claim 1, wherein the power pack module (108) has a filter unit of a type satisfying the provisions on electromagnetic compatibility as applicable and the requirements dictated by existing feed-in conditions.

15. The electric machine according to claim 1, wherein the power pack module (108) is provided with a transducer unit (110) permitting a constant-level intermediate circuit voltage ($U_{ZK}$) to be generated at the output from said power pack module (108).

16. The electric machine according to claim 1, wherein the power pack module (108) is arranged such a distance (A) away from the structural module (107) and/or a cooking space (104) of a steam type cooker that the working temperature of said power pack module (108) is below a predetermined threshold value.

17. The electric machine according to claim 1, wherein the inverter unit (105) comprises an inverter that is rated compatible with the rated voltage ($U_2$) of the electric motor (1).

18. The electric machine according to claim 1, wherein the electric motor (1) is of three-phase synchronous type.

19. The electric machine according to claim 1, wherein the distance (A) between the power pack module (108) and the structural unit (107) is zero.

* * * * *